United States Patent [19]
Hobbs

[11] 4,186,653
[45] Feb. 5, 1980

[54] BELLOWS ASSEMBLY AND METHOD OF MAKING THE SAME

[75] Inventor: Walter V. Hobbs, Columbus, Ohio

[73] Assignee: Ranco Incorporated, Columbus, Ohio

[21] Appl. No.: 847,427

[22] Filed: Nov. 1, 1977

[51] Int. Cl.$^2$ ................................................. F16J 3/04
[52] U.S. Cl. ........................................... 92/34; 60/531
[58] Field of Search ...................... 92/34, 45; 73/368.7;
337/117; 248/27.1; 60/530, 527, 531; 236/99 R

[56] References Cited

U.S. PATENT DOCUMENTS

| | | | |
|---|---|---|---|
| 1,931,663 | 10/1933 | Larson | 73/368.7 |
| 2,045,289 | 6/1936 | Bolin | 92/45 X |
| 2,507,979 | 5/1950 | Kelar | 248/27.1 |
| 2,909,324 | 10/1959 | Weber et al. | 236/99 R |
| 3,930,210 | 12/1975 | Hollyday | 248/27.1 X |

FOREIGN PATENT DOCUMENTS 625272  6/1949  United Kingdom ...................... 337/117

Primary Examiner—Irwin C. Cohen
Attorney, Agent, or Firm—Watts, Hoffmann, Fisher & Heinke Co.

[57] ABSTRACT

A bellows assembly and method of making the assembly are disclosed. The assembly comprises a bellows head including thin walled flexible members which are joined to define an expansible chamber. An anchor fitting attaches and communicates the bellows head to a capillary tube and an expansible fluid occupies the tube and chamber. A base supports the bellows head and capillary tube with the anchor fitting interconnecting the bellows head, tube and base. The anchor fitting is bonded to the diaphragm member and capillary tube and deformably engages the base plate to clamp the base plate to the bellows head.

5 Claims, 11 Drawing Figures

BELLOWS ASSEMBLY AND METHOD OF MAKING THE SAME

BACKGROUND OF THE INVENTION

The present invention relates to fluid operated actuators and more particularly relates to expansible chamber bellows assemblies.

FIELD OF THE INVENTION

Thermostatic and pressure controls have employed thin walled metal bellows for operating actuated devices such as control switches, valves and the like. The bellows are typically filled with a fluid and are flexed in accordance with differential pressure forces acting on the bellows walls. One typical use of such bellows is in thermally responsive controls wherein the expansible chamber defined by the bellows communicates with a closed capillary tube and a vaporizable liquid is contained by the tube and bellows. An increase in temperature at a location along the length of the capillary tube causes an increase in vapor pressure and the bellows chamber expands while a reduction in temperature at a location along the length of the capillary tube permits contraction of the bellows volume. Expansion and contraction of the bellows actuates a switch or valve directly or through a suitable motion transmitting linkage.

In order for such controls to respond accurately and consistently to sensed pressure or temperature changes the bellows assembly must positively engage and remain accurately positioned with respect to the actuated device. Accordingly, bellows heads have conventionally included structurally strong, rigid fittings for both anchoring the bellows head in place with respect to the associated control and for transmitting force from the bellows head to the switch, valve, or motion transmitting linkage. At the same time the bellows chamber must be constructed from easily flexible components in order for the control to be adequately sensitive to pressure or temperature changes.

One successful prior art bellows head included a pair of flexible sheet metal diaphragms hermetically brazed together at their outer peripheries, each having a central opening in which respective force transmitting and anchoring fittings were mounted. The fittings were attached to the respective diaphragm members by brazed joints. The anchor fitting was constructed to be secured to a rigid base plate by a staking operation. The base plate was in turn rigidly attached to the control housing.

The fittings were machined from rod stock (frequently brass) and the brazing operation was usually accomplished by fixturing all of the components of the bellows head together and passing them through a brazing furnace, or the like, in order to bond the assembly components together.

The production costs of these bellows heads were relatively high for a number of reasons in addition to those attributable to costs of materials. The number of brazed joints between components of the assemblies was relatively great which tended to increase the chances for "leaky" malfunctioning bellows being productd. Because the anchor fitting had to be seated in an opening in the associated diaphragm member the diaphragm members of each bellows had to be separately stocked and handled during production. Because the diaphragm members were formed from thin sheets of metal, any operation which would tend to alter the stress conditions of the diaphragm material would also tend to change the diaphragm spring rate and thereby alter the response of the diaphragm to sensed temperature or pressure changes. The stamping operation for producing the diaphragm member openings was such an operation.

SUMMARY OF THE INVENTION

The present invention provides a new and improved bellows assembly and method of making the same wherein the bellows assembly construction is substantially simplified and the cost of its manufacture reduced appreciably compared to the prior art.

A bellows assembly constructed according to the invention includes a supporting base member by which the assembly is anchored to a control unit, a bellows head and a capillary tube. The bellows head includes an anchor fitting by which the bellows head and capillary tube are attached and which fixedly anchors the bellows head to the base member. The anchor fitting is formed from light gage sheet metal having a tubular body section and an outwardly extending peripheral flange at one end which is hermetically bonded to the bellows. The body section projects through a base member opening for receiving the capillary tube which is hermetically bonded in the fitting body. The fitting body both receives the capillary tube and anchors the bellows head to the base member.

The base is firmly clamped between the fitting flange and the crimped fitting body portion. The fitting body section is preferably outwardly upset and crimped, with the crimped portion forced into engagement with the base plate. The anchor fitting thus serves to attach the bellows head to the base member as well as to accurately locate the bellows head with respect to the base.

In a preferred embodiment of the invention the fitting flange is resistance welded to its associated bellows diaphragm so that the confronting bellows diaphragm and fitting flange have a weld joint extending continuously about the fitting body opening. With the diaphragm member so attached to the anchor fitting the portion of the diaphragm extending across the fitting opening is supported and isolated from stress patterns in the remainder of the diaphragm member, and vice versa. Accordingly a simple piercing tool can be thrust through the diaphragm member into the tubular fitting body section without any danger of bending or excessive tearing of the diaphragm member radially beyond the weld joint. Moreover the piercing can be accomplished without materially changing the stress conditions of the diaphragm portion radially outwardly from the flange, i.e. the "spring rate" of the diaphragm is unaffected.

This feature of the invention permits use of identical diaphragm members adjacent the base plate and at the extension side of the bellows head by eliminating the need for producing the bellows chamber opening by a stamping operation as well as eliminating tooling associated with the stamping operation. Any necessity for separately producing, handling and stocking bellows diaphragm members which differ from each other only by virtue of having a stamped bellows chamber opening is also precluded.

Other features and advantages of the invention will become apparent from the following detailed description of a preferred embodiment made with reference to the accompanying drawings.

DESCRIPTION OF A PREFERRED EMBODIMENT

Figure 1:
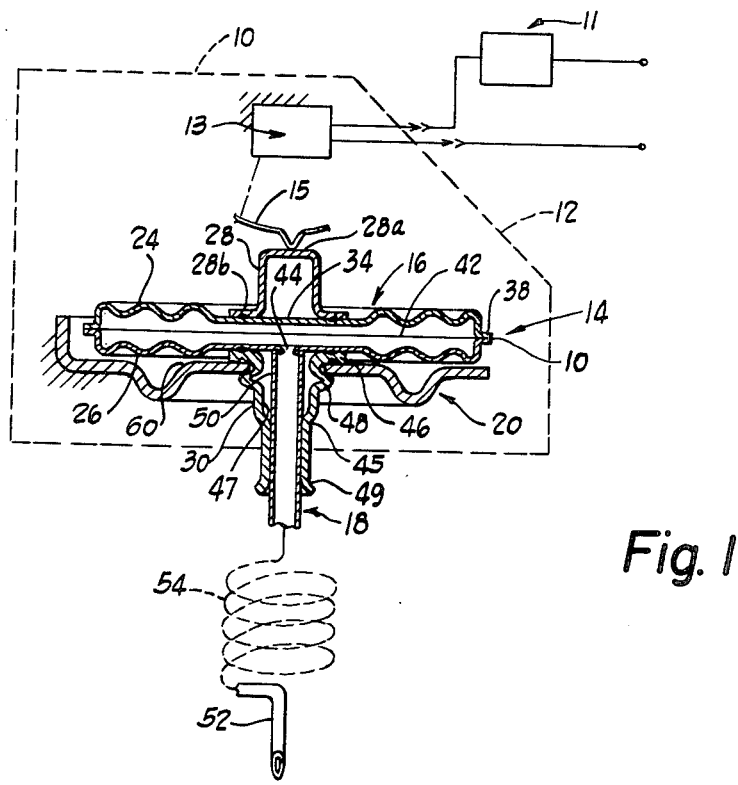
FIG. 1 is a schematic view of a control unit embodying the present invention with parts shown in cross-section.

FIG. 1 of the drawings schematically illustrates a control unit 10 embodying the present invention connected for controlling operation of a suitable control device 11 in response to sensed temperature. The control unit 10 comprises a control housing, or frame, 12 which rigidly supports a control switch 13 and bellows assembly 14, the latter being effective to operate the control switch via an actuating linkage 15 (schematically illustrated). The controlled device can be formed by any suitable electrically operated component and for the purpose of this description may be considered to be an electric motor for driving a refrigerant compressor drive motor which is energized by the control unit 10 in response to a given sensed temperature level and de-energized in response to the control unit sensing a predetermined lower temperature.

The bellows assembly 14 is formed by a bellows head 16, a capillary tube 18 (attached to and communicating with the bellows head), and a supporting base member 20 supporting the bellows head and capillary tube and rigidly supported by the control unit housing 12. The bellows head 16 is preferably a capsule type bellows which expands in response to increases in sensed temperature along the length of the capillary tube and contracts when the temperature along the capillary tube is reduced. Expansion and contraction of the bellows head actuates the control switch 13 via the linkage 15 to control energization of the device 11. The locations of the control switch and bellows assembly relative to the control housing 12 are accurately established and maintained and together with the geometry of the linkage 15 govern the temperature levels at which the device 11 is energized and de-energized.

The bellows head 16 is formed by thin resilient sheet metal diaphragm members 24, 26, an extension point fitting 28 carried by the diaphragm member 24 for engagement with the actuating linkage 15, and an anchor fitting 30 for attaching the diaphragm member 26 to the base member 20 and the capillary tube 18. The diaphragm members 24, 26 are substantially the same, each being formed by a circular body having a central generally circular, planar section 34, a series of circumferential corrugations extending about the central body section 34 and a outwardly extending peripheral flange 38.

The diaphragm flanges 38 are bonded together by a weld bead 40 which extends continuously about the members to establish a hermetic chamber 42 within the bellows head. The chamber 42 is communicable with the capillary tube 18 via a central opening 44 which is formed in the diaphragm member 26. In the preferred embodiment the diaphragm members are formed from stainless steel sheet material which is only a few thousandths of an inch thick.

The capillary 18 is a relatively thin walled copper alloy tube having an open end section 50 received by the anchor fitting, a remote hermetically closed end 52 and a body section 54 which is illustrated in broken lines as forming a helix. The chamber 42 and capillary tube 18 contain a vaporizable fluid of any suitable or conventional type which causes expansion of the bellows head in response to sensed temperature increases along the extent of the capillary and contraction of the bellows head when temperatures along the capillary are reduced.

The extension point fitting 28 is formed from a drawn cup-like sheet steel member which is inverted on the diaphragm member 24 and has a planar end surface 28a engaging the linkage 15 and a circumferential flange 28b by which the extension point fitting is bonded to the diaphragm member central section 34. In the preferred and illustrated embodiment of the invention the diaphragm member 24 and extension point fitting 28 are connected by a resistance welded joint and the diaphragm member central section 34 is imperforate.

The anchor fitting 30 is formed by an open ended drawn sheet steel member which defines a thin walled tubular body 45 extending from the diaphragm member 26 through the supporting base 20 and a circumferential generally planar flange 46 by which the anchor fitting 30 is attached to the diaphragm member central section. The anchor fitting 30 defines a through opening 47 communicating with the central diaphragm opening 44, an outwardly bulged crimp 48 in the body 45 for rigidly clamping the supporting base member and bellows head together, and a flared end section 49 through which the capillary tube is received.

The base member 20 is formed by a stamped structurally strong sheet metal plate defining a central generally circular land 60 supporting the bellows head 16 and a mounting opening 62 through which the anchor fitting 30 extends. In the preferred embodiment the mounting opening 62 is non-circular, or polygonal, and defines relieved sections 64 which coact with the anchor fitting body to effectively key the anchor fitting to the base member and prevent rotation of the bellows head relative to the linkage 15 and the control body.

Figure 2:
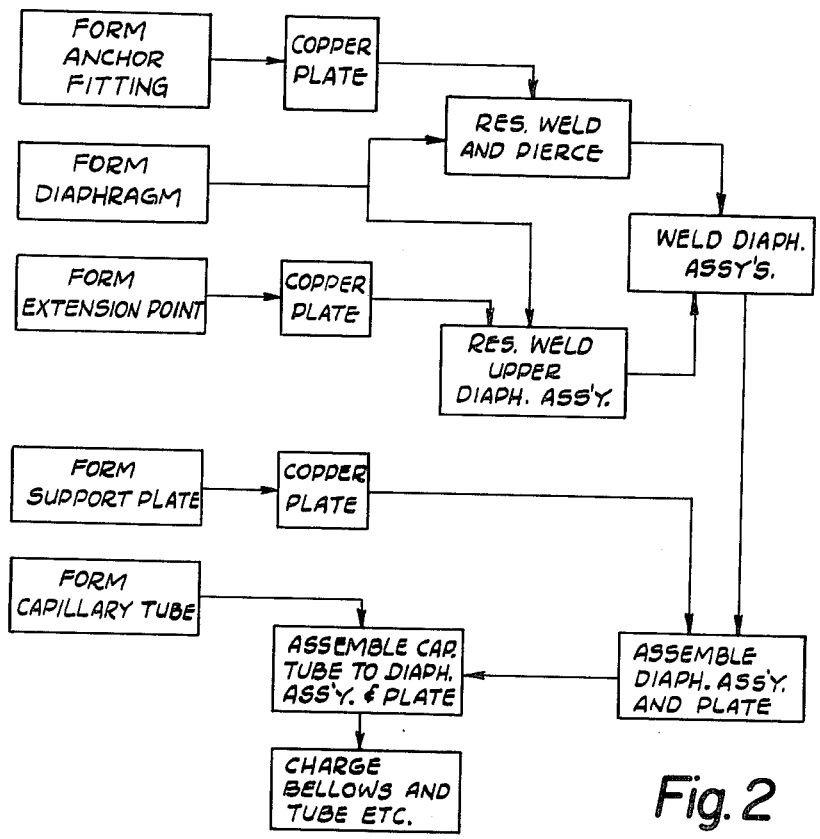
FIG. 2 is a flow chart showing manufacturing steps undertaken in producing bellows assemblies forming part of the control unit of FIG. 1.

FIG. 2 shows, in abbreviated schematic form, a procedure by which the bellows assembly 14 is fabricated. The bellows head is assembled in a series of operations followed by assembly of the bellows head 16, capillary tube 18 and the supporting base 20.

Figure 3:
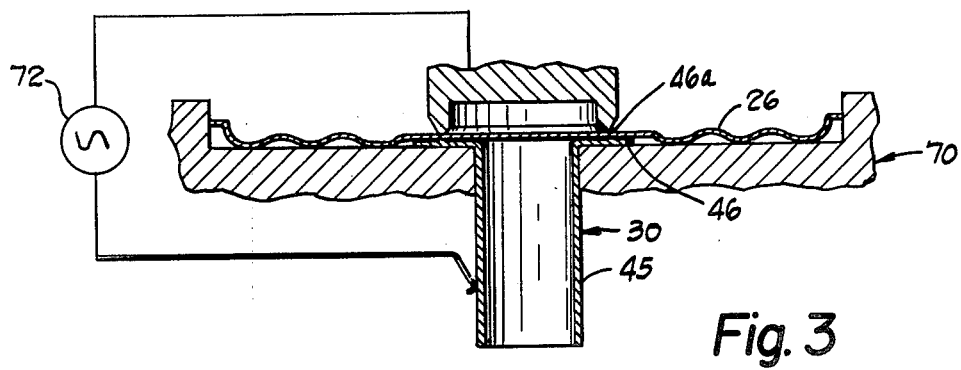
FIG. 3 is a cross sectional view illustrating the diaphragm assembly at one stage of manufacture.

The bellows head 16 is assembled by welding the diaphragm members to the respective extension point and anchor fittings and then to each other. After the extension point and anchor fittings are initially drawn they are copper plated and fed to nests which receive and support the respective fittings and diaphragm members during their joining. Referring to FIG. 3 a nest 70 (illustrated in part) supports an anchor fitting 30 with its flange 46 oriented upwardly and its body 45 extending downwardly through a centering opening in the nest. A diaphragm member 26 is disposed in the nest over the fitting 30 with the nest 70 engaging the diaphragm about its periphery to center it with respect to the fitting.

The fitting and diaphragm are resistance welded together in the next 70 at a welding station illustrated schematically by FIG. 3. The flange 46 is formed with a narrow continuous circumferentially extending bead 46a contacting the diaphragm 26. A resistance welding power supply 72 is connected across the fitting 30 and diaphragm 26. When welding current flows through the juncture of the bead 46a and the diaphragm the fitting and diaphragm materials are rapidly fused together continuously about the flange 46 so that the anchor fitting and diaphragm are hermetically joined.

The resistance welding equipment is schematically illustrated and may be of any suitable type. The welding equipment is preferably constructed so that one welding electrode is reciprocally movable into welding position (as illustrated) when the nest 70 is moved to the welding station. After the weld is formed the electrode is withdrawn to enable the nest to move to another work station.

Assembly of the extension point fitting 28 to the diaphragm 24 is accomplished substantially the same as described in reference to FIG. 3 and therefore is not further illustrated or described.

Figure 4:
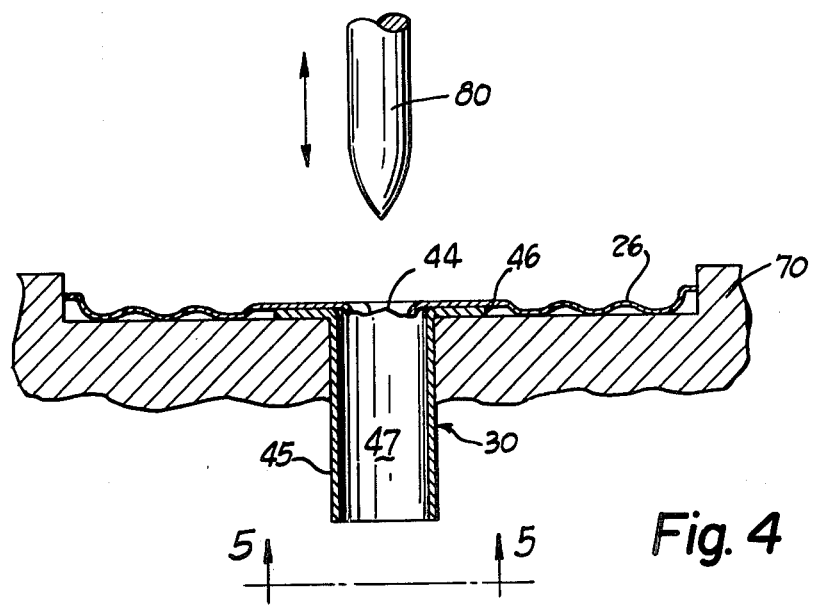
FIG. 4 is a cross sectional view illustrating another stage in the bellows assembly formation.
Figure 5:
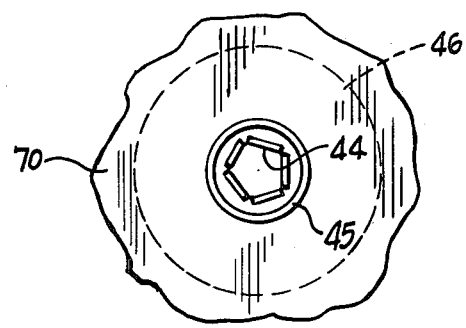
FIG. 5 is a view seen approximately from the plane indicated by the line 5—5 of FIG. 4.

When the diaphragm 26 and anchor fitting 30 are joined, the nest 70 is advanced to a piercing station where the aperture 44 is formed. Referring to FIG. 4 the nest 70 is located in the piercing station so that a piercing tool 80 is aligned with the anchor fitting through the opening 47. The preferred piercing tool 80 is a cylindrical rod having a circularly tapered end forming a sharp point. The tool 80 is advanced into the diaphragm central section where it easily pierces the diaphragm material. When the tool 80 is withdrawn a pentagonal aperture remains in the diaphragm (See FIG. 5).

Because the diaphragm is welded to the anchor fitting about the flange 46 the piercing operation does not affect the stress in the diaphragm radially beyond the anchor fitting flange 46. Accordingly the formation of the aperture 44 in the diaphragm member 26 does not alter the spring rate of the diaphragm. Moreover the polygonal shape of the aperture 44 serves to prevent the capillary tube end 50 from extending into the chamber 42.

Figure 6:
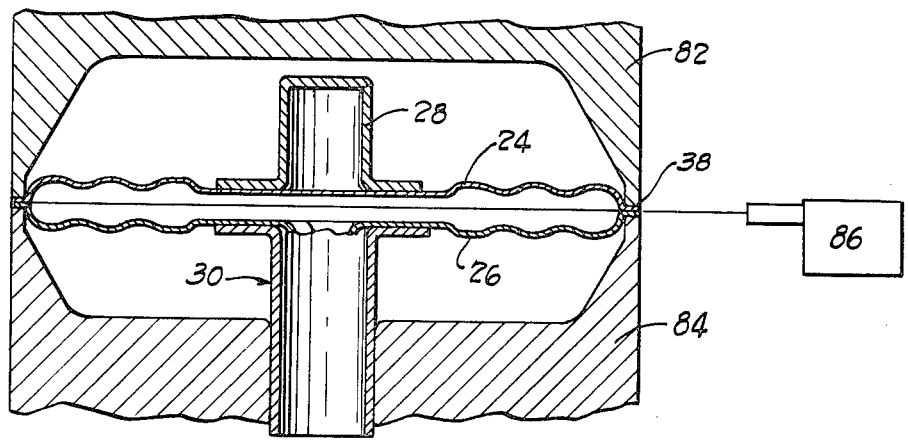
FIG. 6 is a cross sectional view of a bellows head subassembly during a welding operation.
Figure 11:
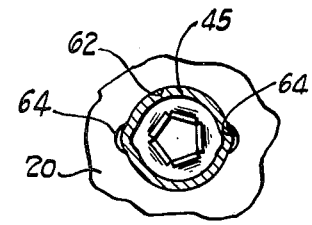
FIG. 11 is a view seen approximately from the plane indicated by the line 11—11 of FIG. 9.

The bellows head assembly is completed by hermetically joining the diaphragm members along their peripheral flanges 38. Referring now to FIG. 6 the welded diaphragms and fittings are separately transported to a laser beam welding apparatus where they are situated in mating nests 82, 84 and welded together by use of a laser 86. The nest are constructed from a metal which is an efficient heat conductor have circumferential projecting rims between which the diaphragm flanges 38 are clamped and are rotatable. The nests are rotatably driven by a suitable drive mechanism to rotate the engaged diaphragms relative to the laser beam. The engaged flanges 38 are thus moved through the laser beam which melts and fuses the diaphragm flanges. The heat conductive nest material carries heat away from the weld joint to chill it. After slightly more than 360 degrees of rotation the laser beam is discontinued and the welded bellows head is removed from the nests 82, 84.

Figure 7:
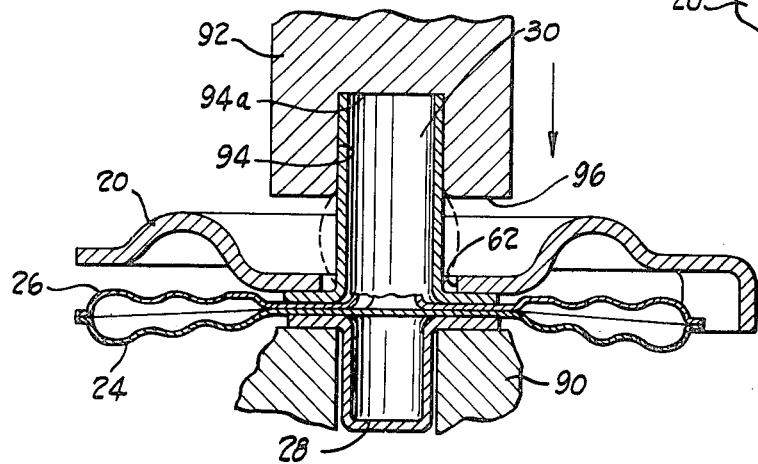
FIG. 7–10 are fragmentary cross sectional views of stages in the assembly of the bellows head to a supporting base.
Figure 8:
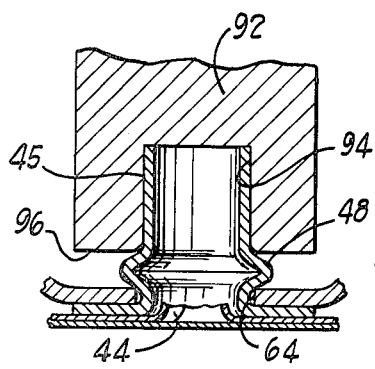

The assembled bellows head is then attached to the supporting base member 20. In accordance with the present invention and as illustrated by FIGS. 7 and 8 the bellows head assembly is placed in a supporting nest 90 (only a part of which is shown) with the anchor fitting body 45 extending upwardly. The base member is disposed on the bellows head assembly with the anchor fitting body extending loosely through the base member mounting opening 62. The nest 90 is moved to a work station illustrated in FIGS. 7 and 8 at which the anchor body is upset by a forming tool 92 to clamp the base member and bellows assembly together. The tool 92 defines a cylindrical cavity 94 conforming to the cylindrical shape of the undeformed fitting body 45. The cavity 94 defines an internal end face 94a which engages the projecting end of the fitting body as the tool advances and an external annular end face 96 surrounding the cavity 94 for crimping the fitting body against the base member.

As the tool 92 advances, the projecting end of the anchor fitting body is closely surrounded and supported by the tool cavity wall 94. When the end face 94a engages the projecting end of the anchor fitting body the anchor fitting body section between the tool 92 and the base member bulges outwardly as illustrated by the broken lines in FIG. 7. The outwardly bulging body section expands into the supporting base opening 62. Part of the bulged section expands into the relieved opening sections 64 so that the support base and bellows head assembly are fixed against relative rotation by the key-like interengagement between anchor fitting and supporting base.

As the tool 92 continues to advance toward the support base its external end face 96 engages the bulged section of the anchor fitting body and crimps the bulged section against the support base (See FIG. 8). The compressive force exerted by the tool 92 on the bellows head assembly assures that the central sections of the bellows diaphragms are engaged with each other due to flexure of the diaphragm members and therefore that the anchor fitting flange 46 is urged against the support base. Thus, when the bulged section of the body 15 is crimped, as illustrated by FIG. 8, the support base is tightly clamped between the crimped fitting body section and the flange 46. The clamping between the fitting body and the base member fixes the spatial relationship between these components so that when the base is fixed to the control body the control will be readily calibrated and operate reliably.

Figure 9:
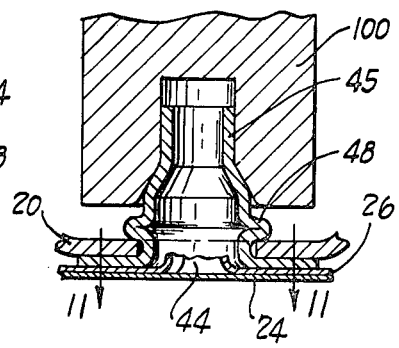
Figure 10:
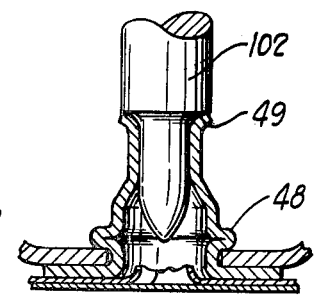

The bellows assembly undergoes additional forming operations preparatory to the capillary tube being attached. The nest 90 is moved to a work station at which the anchor fitting body projecting end is necked down to produce an inside diameter just slightly greater than the capillary tube diameter (See FIG. 9). This operation is accomplished with a suitably tool 100 which is forced onto the fitting body to deform it and then retracted.

At a succeeding work station the projecting tip end of the fitting body is flared radially outwardly by a male tool 102 which is thrust into the fitting body.

The capillary tubing is then inserted into the anchor fitting body and a suitable brazing material is placed in the flared fitting body end. The capillary tube end 50 engages the diaphragm member 26 preventing the tube end from entering the chamber 42.

The capillary tube brazing material and anchor fitting are subjected to a source of high temperature flame, or a high temperature furnace atmosphere, which melts the brazing material to hermetically bond the capillary tube to the anchor fitting.

The temperature responsive fluid is then introduced into the capillary tube and chamber 42 after which the capillary tube end 52 is sealed closed.

As indicated previously, the bellows assembly is fixed to the control unit housing 12 so that the bellows head support location is rigidly fixed. The supporting base is generally fixed to the housing by a staking operation after which the control is calibrated.

While only a single embodiment of the invention is illustrated and described in detail the present invention is not to be considered limited to the precise construction and methods of construction disclosed. Various modifications, adaptations and uses of the invention will become apparent to those skilled in the fields to which the invention relates and the intention is to cover all such modifications, adaptations and uses which come within the scope or spirit of the attached claims.

I claim:

1. A bellows assembly comprising:
    (a) a bellows head including a thin walled flexible member defining at least part of an expansible chamber and having an aperture therein;
    (b) a tube communicating with the chamber via said aperture;
    (c) a rigid base member supporting said bellows head and extending along said flexible member, said base member defining an opening aligned with said aperture;
    (d) a fitting interconnecting said flexible member, tube and base member comprising:
        (i) a thin walled tubular body surrounding said tube and extending through said base member opening;
        (ii) a flange disposed between said base member and said flexible member, said flange bonded to said flexible member about said aperture so that said aperture is aligned with said tubular body;
        (iii) an outwardly upset fitting body portion engaged with said base member outwardly from said base member opening and exerting a force acting on said base member in the direction of said bellows head to firmly clamp said base member and said bellows head together; and,
        (iv) means interposed between said fitting and said base member opening for locking against relative rotation; and
    (e) bonding means for securing said tube in said body member.

2. The bellows assembly claimed in claim 1 wherein said outwardly upset fitting body portion is crimped into engagement with said base member to define a clamping face engaging said base member.

3. The bellows assembly claimed in claim 2 wherein said fitting flange engages said base member on an opposite side from said crimped body portion.

4. The bellows assembly claimed in claim 1 wherein said flexible member is formed by a thin metal diaphragm, and further including a second diaphragm member, said first and second diaphragm members bonded together along their circumferences.

5. A bellows assembly comprising:
    (a) a bellows head including a thin walled flexible member defining at least part of an expansible chamber and having an aperture therein;
    (b) a tube communicating with the chamber via said aperture;
    (c) a rigid base member supporting said bellows head and extending along said flexible member, said base member defining a polygonal opening aligned with said aperture; and
    (d) a fitting interconnecting said flexible member, tube and base member comprising:
        (i) a thin walled tubular body surrounding said tube and extending through said base member opening;
        (ii) a flange disposed between said base member and said flexible member, said flange bonded to said flexible member about said aperture so that said aperture is aligned with said tubular body;
        (iii) an outwardly upset fitting body portion engaged with said base member to clamp said base member and said bellows head together, said fitting body wall upset to engage at least part of said polygonal opening to lock said bellows head against rotation relative to said base member; and
    (e) bonding means for securing said tube in said body member.

* * * * *